US012652349B2

(12) United States Patent
Matsumoto

(10) Patent No.: US 12,652,349 B2
(45) Date of Patent: Jun. 9, 2026

(54) TELEPHONE EXCHANGE APPARATUS, TELEPHONE SYSTEM, TELEPHONE EXCHANGE METHOD, AND PROGRAM

(71) Applicant: NEC Platforms, Ltd., Kawasaki (JP)

(72) Inventor: Yosuke Matsumoto, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 307 days.

(21) Appl. No.: 18/284,432

(22) PCT Filed: Mar. 4, 2022

(86) PCT No.: PCT/JP2022/009541
§ 371 (c)(1),
(2) Date: Sep. 27, 2023

(87) PCT Pub. No.: WO2022/209596
PCT Pub. Date: Oct. 6, 2022

(65) Prior Publication Data
US 2024/0163369 A1 May 16, 2024

(30) Foreign Application Priority Data
Apr. 1, 2021 (JP) ................................. 2021-062479

(51) Int. Cl.
H04M 3/42 (2006.01)

(52) U.S. Cl.
CPC ... H04M 3/42263 (2013.01); H04M 3/42357 (2013.01); H04M 2203/2072 (2013.01); H04M 2242/30 (2013.01)

(58) Field of Classification Search
CPC ......... H04M 3/42263; H04M 3/42357; H04M 2242/30; H04M 2203/2072
(Continued)

(56) References Cited

U.S. PATENT DOCUMENTS

| | | | |
|---|---|---|---|
| 8,488,761 B2 * | 7/2013 | Reding | H04M 3/56 379/142.01 |
| 8,942,367 B1 * | 1/2015 | Croak | H04M 3/42374 379/211.02 |

(Continued)

FOREIGN PATENT DOCUMENTS

| | | | |
|---|---|---|---|
| EP | 2206327 B1 * | 5/2012 | ............ H04M 3/465 |
| JP | 2003-517776 A | 5/2003 | |

(Continued)

OTHER PUBLICATIONS

International Search Report for PCT Application No. PCT/JP2022/009541, mailed on Apr. 5, 2022.

(Continued)

*Primary Examiner* — Jirapon Tulop
(74) *Attorney, Agent, or Firm* — Sughrue Mion, PLLC

(57) ABSTRACT

A telephone exchange apparatus includes an acquisition unit, an extraction unit, a specification unit, and a call control unit. In a case where an incoming call including a user ID is detected, the acquisition unit acquires event information of a user having the user ID, the event information indicating a schedule event. The extraction unit extracts location information of the user from the event information. The specification unit specifies a telephone terminal to which the user is most likely to respond among telephone terminals on a basis of the location information, the telephone terminals having been used by the user in a past. The call control unit causes the specified telephone terminal to ring.

16 Claims, 8 Drawing Sheets

(58) Field of Classification Search
USPC .......................................................... 455/417
See application file for complete search history.

(56)                    References Cited

U.S. PATENT DOCUMENTS

| 2006/0091205 | A1 |   | 5/2006 | Agrawal et al. | |
|---|---|---|---|---|---|
| 2006/0093121 | A1 |   | 5/2006 | Sylvain | |
| 2013/0060587 | A1 | * | 3/2013 | Bayrak .................. | G06Q 10/10 |
|   |   |   |   |   | 705/7.11 |

FOREIGN PATENT DOCUMENTS

| JP | 2007-088702 A | 4/2007 |
|---|---|---|
| JP | 2008-061278 A | 3/2008 |
| JP | 2008-515296 A | 5/2008 |
| JP | 2012-120022 A | 6/2012 |
| JP | 2018-082358 A | 5/2018 |
| JP | 2019-192973 A | 10/2019 |

OTHER PUBLICATIONS

European Search Report for EP Application No. 22779821.2, dated on Jun. 28, 2024.

* cited by examiner

| USER ID | TELEPHONE TERMINAL ID | PLACE (LOCATION INFORMATION) | DATE | DAY OF WEEK | TIME |
|---|---|---|---|---|---|
| USER A | T001 | — | 2020/11/2 | MONDAY | 8 : 50 : 22 |
| USER B | T004 | CONFERENCE ROOM X | 2020/11/2 | MONDAY | 9 : 28 : 22 |
| USER C | T001 | — | 2020/11/2 | MONDAY | 11 : 11 : 11 |
| USER A | T002 | OUTSIDE OFFICE | 2020/11/3 | TUESDAY | 13 : 24 : 22 |
| USER A | T001 | COMPANY Y | 2020/11/4 | WEDNESDAY | 14 : 33 : 33 |
| USER A | T001 | — | 2020/11/6 | FRIDAY | 8 : 50 : 22 |

Fig. 4

| USER ID | TELEPHONE TERMINAL ID | PLACE (LOCATION INFORMATION) | DATE | DAY OF WEEK | TIME |
|---------|----------------------|------------------------------|------|-------------|------|
| USER A | T001 | OUTSIDE OFFICE | 2020/11/2 | MONDAY | 8 : 51 : 22 |
| USER A | T003 | OUTSIDE OFFICE | 2020/11/3 | TUESDAY | 9 : 28 : 21 |
| USER A | T002 | OUTSIDE OFFICE | 2020/11/4 | WEDNESDAY | 11 : 12 : 11 |
| USER A | T002 | OUTSIDE OFFICE | 2020/11/4 | WEDNESDAY | 17 : 24 : 22 |
| USER A | T001 | OUTSIDE OFFICE | 2020/11/5 | THURSDAY | 14 : 33 : 23 |
| USER A | T001 | OUTSIDE OFFICE | 2020/11/9 | MONDAY | 11 : 33 : 23 |

Fig. 7

| USER ID | TELEPHONE TERMINAL ID | PLACE (LOCATION INFORMATION) | DATE | DAY OF WEEK | TIME |
|---------|----------------------|------------------------------|------|-------------|------|
| USER A | T003 | — | 2020/11/2 | MONDAY | 14 : 51 : 22 |
| USER A | T003 | — | 2020/11/2 | MONDAY | 15 : 28 : 21 |
| USER A | T002 | — | 2020/11/9 | MONDAY | 15 : 12 : 11 |
| USER A | T003 | — | 2020/11/9 | MONDAY | 15 : 24 : 22 |
| USER A | T001 | — | 2020/11/16 | MONDAY | 14 : 33 : 23 |
| USER A | T001 | — | 2020/11/23 | MONDAY | 15 : 13 : 23 |

Fig. 8

TELEPHONE EXCHANGE APPARATUS, TELEPHONE SYSTEM, TELEPHONE EXCHANGE METHOD, AND PROGRAM

This application is a National Stage Entry of PCT/JP2022/009541 filed on Mar. 4, 2022, which claims priority from Japanese Patent Application 2021-062479 filed on Apr. 1, 2021, the contents of all of which are incorporated herein by reference, in their entirety.

TECHNICAL FIELD

The present disclosure relates to a telephone exchange apparatus, a telephone system, a telephone exchange method, and a program.

BACKGROUND ART

Users who use a plurality of telephone terminals such as a fixed-line phone at home, a personal mobile phone, and a telephone in an office are increasing. In a case where a call is made to a called party using a plurality of telephone terminals, a calling party selects one telephone terminal in consideration of a location of the called party such as where the called party is at present, and makes a call by using a telephone number of the selected telephone terminal.

Here, a telephone exchange apparatus that changes a response to an incoming call in accordance with an action or location of the called party has been proposed. For example, Patent Literature 1 discloses a method in which a call routing rule in a case where a call is received with each telephone number is defined for each action mode of a user, and any of different modes is activated in accordance with a place of a called party detected on the basis of a telephone usage record of the user.

In addition, Patent Literature 2 discloses a presence management system in which it is determined whether a watched party is available for contact or not in a case where a contact request using a presence management system identifier for the watched party is received from a watching party, and the best communication mode is selected in a case where the watched party is available for contact.

In addition, Patent Literature 3 discloses a system for automatic incoming call response during absence in which a location status of a user is detected by using an RFID tag held by the user and an automatic response is made to an incoming call in accordance with an incoming call response operation condition for a telephone associated with the location status.

CITATION LIST

Patent Literature

Patent Literature 1: Published Japanese Translation of PCT International Publication for Patent Application, No. 2008-515296

Patent Literature 2: Published Japanese Translation of PCT International Publication for Patent Application, No. 2003-517776

Patent Literature 3: Japanese Unexamined Patent Application Publication No. 2007-088702

SUMMARY OF INVENTION

Technical Problem

However, the technology disclosed in Patent Literatures 1 and 2 described above has a problem that it is necessary for the user to register a terminal or a call routing rule that can be used in advance, which takes time and effort. Note that the technology disclosed in Patent Literature 3 described above has a problem that it is difficult to connect a telephone to the called party in a case where the called party is away from the telephone. Therefore, a more user-centric telephone exchange apparatus is required.

In view of the above-described problems, it is an object of the present disclosure to provide a user-centric telephone exchange apparatus, a telephone system, a telephone exchange method, and a program.

Solution to Problem

According to an aspect of the present disclosure, there is provided a telephone exchange apparatus including an acquisition unit, an extraction unit, a specification unit, and a call control unit. In a case where an incoming call including a user ID is detected, the acquisition unit is configured to acquire event information of a user having the user ID, the event information indicating a schedule event. The extraction unit is configured to extract location information of the user from the event information. The specification unit is configured to specify a telephone terminal to which the user is most likely to respond among telephone terminals that have been used by the user in a past on a basis of the location information. The call control unit is configured to cause the specified telephone terminal to ring.

According to another aspect of the present disclosure, there is provided a telephone system including a plurality of telephone terminals and the telephone exchange apparatus described above.

According to still another aspect of the present disclosure, there is provided a telephone exchange method performed by a computer functioning as the telephone exchange apparatus described above.

According to still another aspect of the present disclosure, there is provided a program for causing a computer to execute the telephone exchange method described above.

Advantageous Effects of Invention

According to the aspects of the present disclosure, there can be provided a user-centric telephone exchange apparatus, a telephone system, a telephone exchange method, and a program.

BRIEF DESCRIPTION OF DRAWINGS

FIG. 4 is a diagram illustrating an example of a data structure of an operation log according to the second example embodiment.

FIG. 7 is a diagram for explaining operation log extraction processing according to the second example embodiment.

FIG. 8 is a diagram for explaining operation log extraction processing according to the second example embodiment.

EXAMPLE EMBODIMENTS

Figure 1:
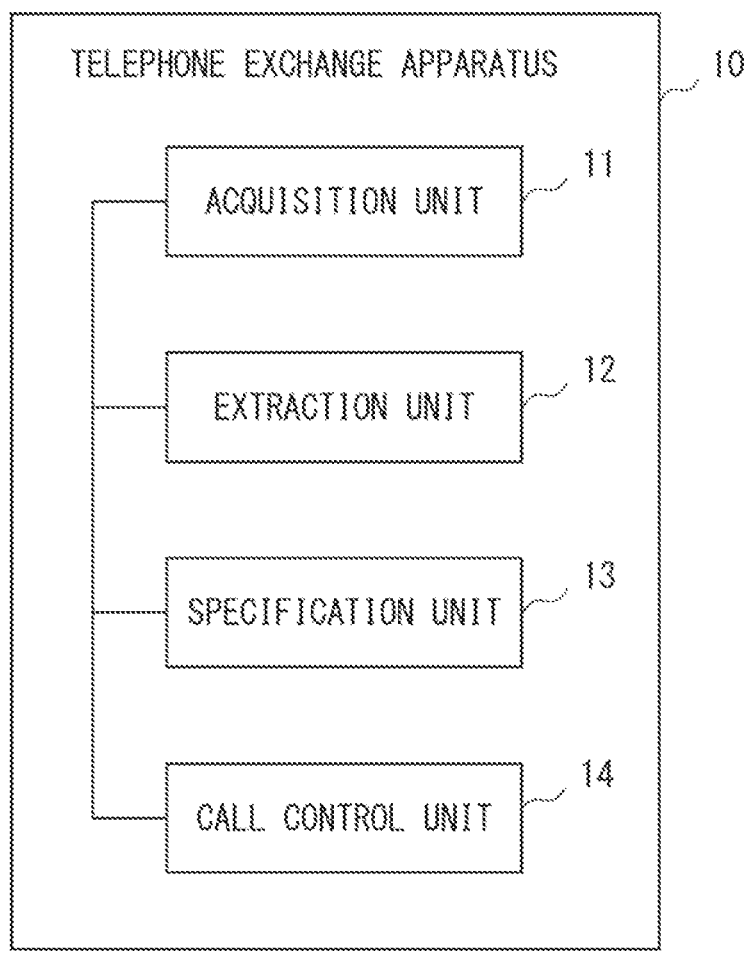
FIG. 1 is a block diagram illustrating a configuration of a telephone exchange apparatus according to a first example embodiment.

Hereinafter, the present disclosure will be described through example embodiments, but the disclosure according to the claims is not limited to the following example embodiments. In addition, not all the configurations described in the example embodiments are essential as means for solving the problems. In each drawing, the same elements are denoted by the same reference signs, and redundant description thereof is omitted as necessary.

Problems of Example Embodiment

Here, problems of the example embodiment will be described again.

In a case where an operation such as an outgoing/incoming call is performed, a method of using a telephone number assigned to a user is used. This method is an idea focusing on a number, that is, a number-centric idea. On the other hand, in recent years, it has become common for one user to have a plurality of terminals (a smartphone, a personal computer, a telephone, and the like), and a method focusing on a user, that is, a user-centric method has been required. For example, there is a demand for a system that allows a telephone call to be connected to the other party even when a calling party is not conscious of where the other party with which the calling party wants to make contact is currently.

In the user-centric method, a plurality of terminals is associated with one user. In a case where the user receives an incoming call, a telephone exchange apparatus, for example, a private branch exchange (PBX) only has caused all the terminals to ring at the same time, or a priority order of ringing has been set in advance and only ringing has been performed in order. Therefore, the ringing can be performed only in the order defined in advance, and there have been the following problems.

A first problem is that a terminal at a place where the user is not nearby is caused to ring frequently, and a person near the terminal feels annoyed with the terminal that is continuously ringing without anyone responding. A second problem is that network traffic is unnecessarily increased by causing a terminal that is unlikely to respond to ring. A third problem is that the increase in traffic causes processing of the telephone exchange apparatus to increase, and hardware resources are wastefully consumed. A fourth problem is that it is troublesome for the user to set the ringing order one by one or change the setting.

Here, Patent Literatures 1 to 3 described above disclose a technology of changing a response to an incoming call in accordance with an action or location of a called party. In particular, in Patent Literature 2, since the watching party can make a contact request by using the presence management system identifier of the watched party, the watching party does not need to know direct contact details of the watched party. However, as described above, the technologies disclosed in Patent Literatures 1 and 2 have a problem that it is necessary for the user to register a terminal or a call routing rule that can be used in advance, which takes time and effort. Note that the technology disclosed in Patent Literature 3 described above has a problem that it is difficult to connect the telephone to the called party. Therefore, a more user-centric telephone exchange apparatus is required.

The present example embodiments have been made to solve such problems.

First Example Embodiment

Next, a first example embodiment of the present disclosure will be described. FIG. 1 is a block diagram illustrating a configuration of a telephone exchange apparatus 10 according to the first example embodiment. The telephone exchange apparatus 10 is a computer apparatus that causes a telephone terminal to which a user is likely to respond to ring in response to an incoming call to the user. The telephone exchange apparatus 10 includes an acquisition unit 11, an extraction unit 12, a specification unit 13, and a call control unit 14.

In a case where an incoming call including a user ID is detected, the acquisition unit 11 acquires event information of the user having the user ID, the event information corresponding to a date and time of the incoming call. The user ID is information for identifying a user. The user ID may be the name of the user, or may be a number unique to the user. Here, the user ID included in the incoming call is a user ID of a called party. In addition, the event information is information indicating a schedule event of the user in a predetermined period. The acquisition unit 11 supplies the user ID and the acquired event information to the extraction unit 12.

The extraction unit 12 extracts location information of the user having the user ID from the event information. The location information is information indicating the location of the user. The extraction unit 12 supplies the extracted location information of the user to the specification unit 13.

The specification unit 13 specifies a telephone terminal to which the user is most likely to respond among telephone terminals used by the user in the past on the basis of the location information. Specifically, the specification unit 13 specifies a telephone terminal to which the user is most likely to respond among the telephone terminals used by the user in the past on the basis of the location information and a usage history of the telephone terminal used by the user in the past. The specification unit 13 supplies information on the specified telephone terminal to the call control unit 14.

The call control unit 14 detects an incoming call including a user ID. When an incoming call is detected, the call control unit 14 supplies a fact that the incoming call is detected and the user ID to the acquisition unit 11. In addition, the call control unit 14 causes the telephone terminal specified by the specification unit 13 to ring. Specifically, the call control unit 14 uses a telephone terminal ID of the specified telephone terminal to cause the telephone terminal to ring and call the telephone terminal. The telephone terminal ID may be a telephone number.

Figure 2:
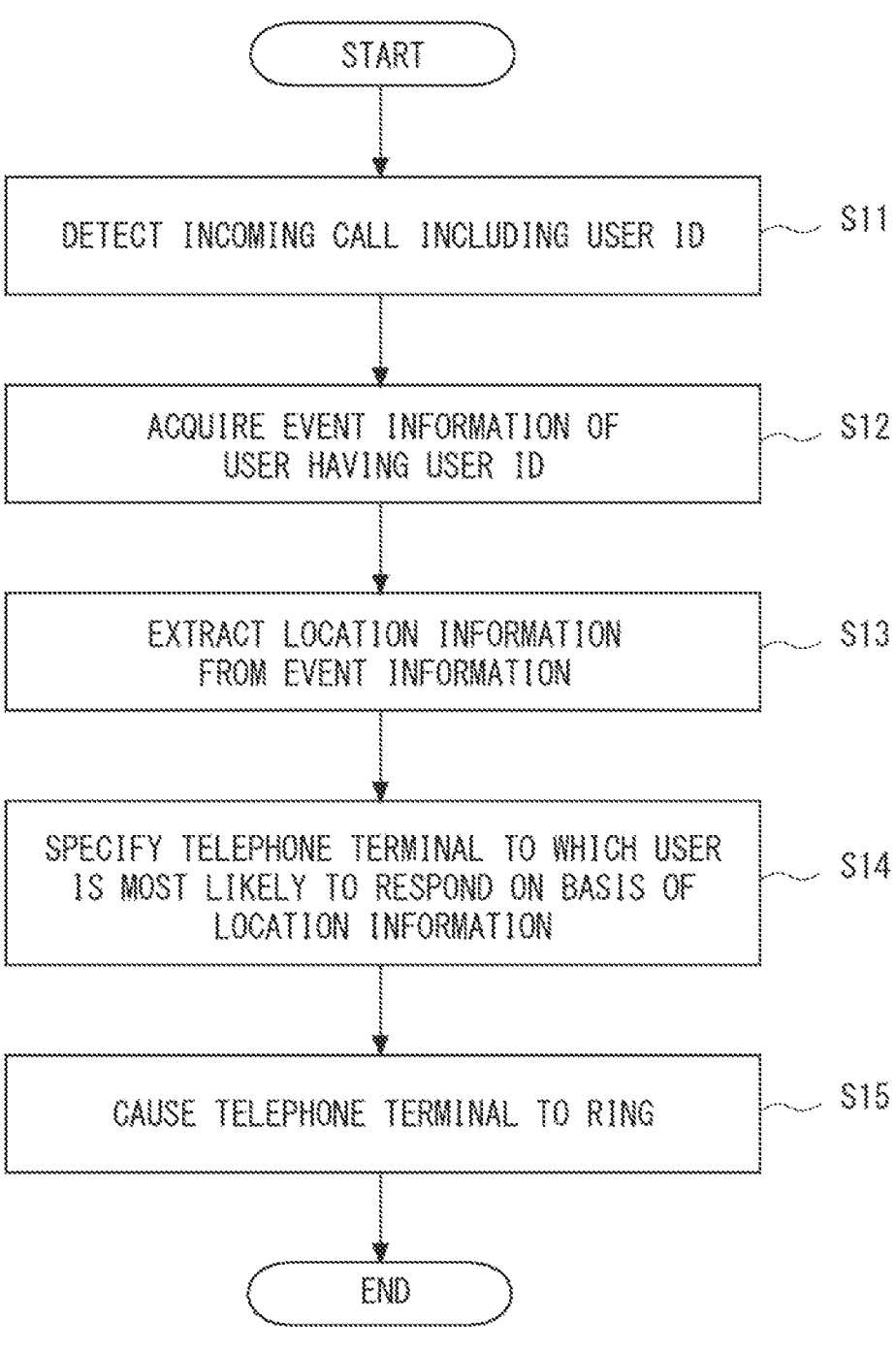
FIG. 2 is a flowchart illustrating a flow of a telephone exchange method according to the first example embodiment.

FIG. 2 is a flowchart illustrating a flow of a telephone exchange method according to the first example embodiment. First, the call control unit 14 of the telephone exchange apparatus 10 detects an incoming call including a user ID (Step S11). Next, the acquisition unit 11 acquires event information of a user having the user ID, which corresponds to a date and time of the incoming call (Step S12). Next, the extraction unit 12 extracts location information from the event information (Step S13). Next, the specification unit 13 specifies a telephone terminal to which the user is most likely to respond among telephone terminals that have been used by the user in the past on the basis of the location information (Step S14). Then, the call control unit 14 causes the specified telephone terminal to ring (Step S15).

As described above, in the telephone exchange apparatus 10 according to the first example embodiment, even in a case where the called party has a plurality of telephone terminals, it is possible to make a call to the telephone terminal which is easily connected to the called party only by specifying the user ID of the called party. Therefore, it is possible to avoid causing a telephone terminal to which the called party is unlikely to respond to ring. In addition, it is possible to suppress an increase in network traffic and prevent congestion. Therefore, hardware resources of the telephone exchange apparatus 10 can be saved.

Since the telephone exchange apparatus 10 causes the telephone terminal selected on the basis of a usage history of the telephone terminal used by the user in the past to ring, the user does not necessarily need to register, in advance, the telephone terminal to be used. In addition, the telephone exchange apparatus 10 can also call a telephone terminal that is not owned by the user but may be used, such as a shared telephone terminal installed in a conference room. Therefore, user-centricity is improved.

Second Example Embodiment

Figure 3:
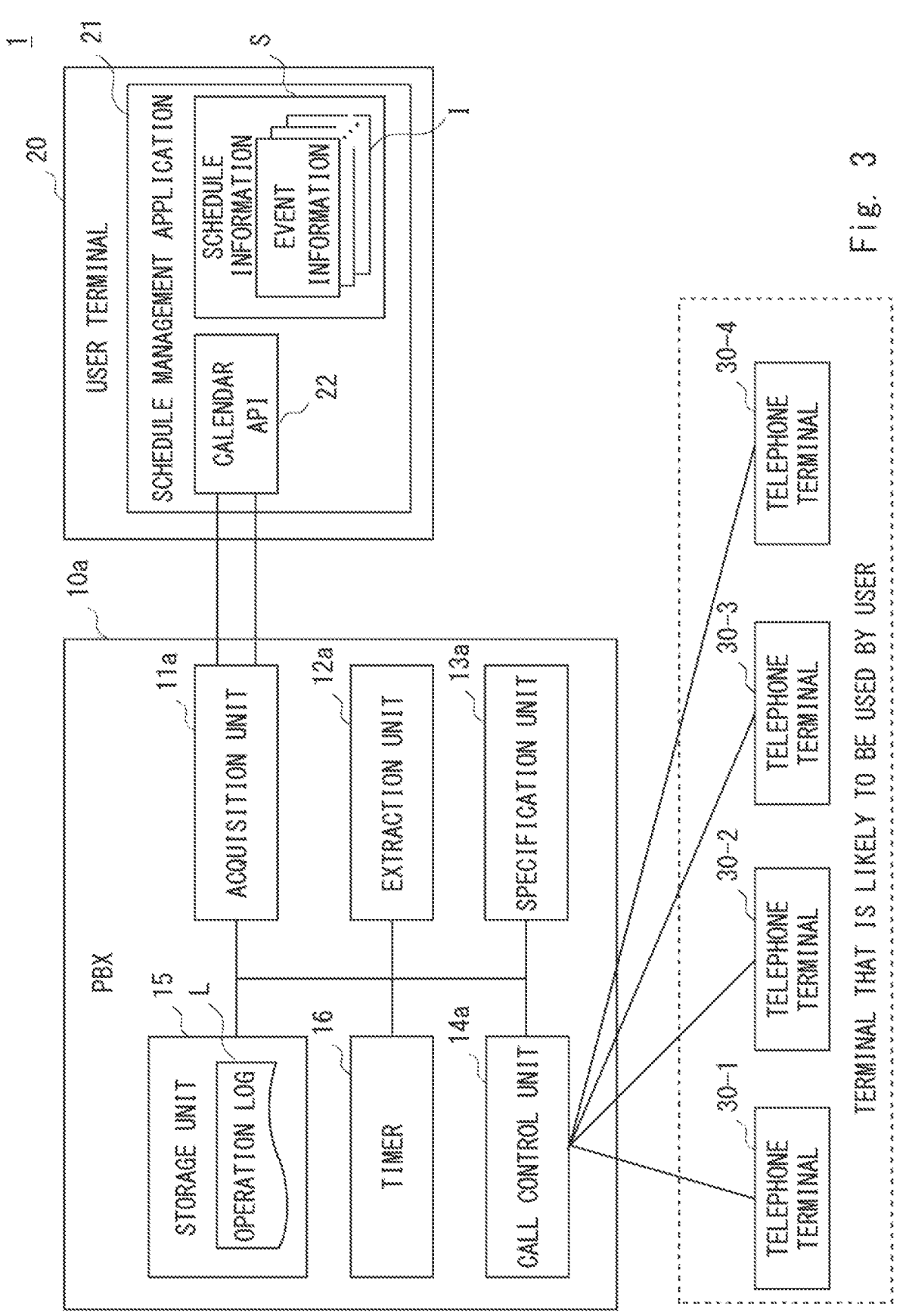
FIG. 3 is a block diagram illustrating a configuration of a telephone system according to a second example embodiment.

Next, a second example embodiment of the present disclosure will be described. FIG. 3 is a block diagram illustrating a configuration of a telephone system 1 according to the second example embodiment. The telephone system 1 is a computer system that relays an incoming call to a user to a telephone terminal to which the user is likely to respond. In the telephone system 1, there are two phases including a first phase that is a phase before operation and a second phase that is a phase during operation. The first phase and the second phase will be described later. The telephone system 1 includes a PBX 10a, a user terminal 20, and telephone terminals 30-1, 30-2, 30-3, and 30-4.

The telephone terminals 30-1, 30-2, 30-3, and 30-4 are telephone terminals that are likely to be used by one user. The telephone terminals that are likely to be used by one user may be telephone terminals that the user has used in the first phase. For example, the telephone terminals 30-1 to 30-4 may be a fixed-line phone at the user's home, a mobile phone or a smartphone owned by the user, a telephone terminal installed in the user's company, and a telephone terminal installed in a conference room, which the user ever has used, respectively. Hereinafter, the telephone terminals 30-1, 30-2, 30-3, and 30-4 may be simply referred to as a telephone terminal 30 in a case of referring to the telephone terminals 30-1, 30-2, 30-3, and 30-4 without distinction. Note that although the number of telephone terminals 30 is four in FIG. 3, it may be three or less or five or more.

In the first phase, the telephone terminal 30 of the calling party transmits an incoming call request (connection request) including at least a telephone terminal ID of the called party to the PBX 10a. Then, the telephone terminal 30 of the called party rings in response to a call from the PBX 10a, and responds to the call in a case where the called party performs a response operation. As a result, a connection between the telephone terminal 30 of the calling party and the telephone terminal 30 of the called party is established.

In the second phase, the telephone terminal 30 of the calling party transmits, to the PBX 10a, an incoming call request (connection request) to a telephone terminal to which a user who is the called party is likely to respond. The incoming call request described above includes at least a user ID associated with the called party. Therefore, the calling party only needs to specify the user ID associated with the called party, and is not required to directly specify contact information of the called party. Then, the telephone terminal 30 of the called party rings in response to a call from the PBX 10a, and responds to the call in a case where the called party performs a response operation. As a result, a connection between the telephone terminal 30 of the calling party and the telephone terminal 30 of the called party is established.

The user terminal 20 is an information terminal used by the user. The user terminal 20 is a personal computer, a smartphone, a tablet terminal, or any other input/output information terminal. The user terminal 20 may be an information terminal different from the telephone terminals 30-1, 30-2, 30-3, and 30-4, or may function as any of the telephone terminals 30-1, 30-2, 30-3, and 30-4. The user terminal 20 includes a schedule management application 21.

The schedule management application 21 is an application that manages a schedule of the user. Note that the schedule management application 21 may be an application that operates on a server (not illustrated) separately installed and collectively manages the schedule of each user registered from the user terminal 20. In addition, the schedule management application 21 may be an application that operates on the PBX 10a and collectively manages the schedule of each user registered from the user terminal 20. The schedule management application 21 includes a calendar API 22 and holds schedule information S.

The calendar API 22 is an application program interface (API) of the schedule management application 21. In addition, the schedule information S is information in which a schedule of the user in a predetermined period is stored. The schedule information S may be referred to as calendar information. The schedule information S contains one piece or a plurality of pieces of event information I. The event information I is information indicating an event in a specific period registered as the schedule of the user, that is, information indicating a schedule event of the user in a specific period. The event information I contains at least information indicating a period. In addition, at least part of the event information I contained in the schedule information S may contain event item information indicating the content of the event in addition to the information indicating the period. That is, the event information I may be one that contains the event item information or one that may not contain the event item information. Here, the event item information may be event item information indicating a location attribute and event item information not indicating any location attribute. That is, the event information I may be event information I indicating a location attribute or event information I not indicating any location attribute. As an example, the event item information indicating the location attribute may be "Outside the office", "In a meeting", or "Company Y". Then, as an example, the event information I indicating the location attribute may be "Outside the office: 2020/11/3 10:00-15:00", "In a meeting (Conference room X): 2020/11/2 9:00-11:00", or "At work (Company Y): 2020/11/4 9:00-17:00". On the other hand, the event item information not indicating the location attribute may be, for example, "Telephone" or "Anniversary". Then, as an example, the event information I not indicating the location attribute may be "Telephone: 2020/11/3 13:00-13:30" or "Anniversary: 2020/11/11 0:00-23:59:59".

The PBX 10a is an on-premise telephone that relays an incoming call to a user to a telephone terminal to which the user is likely to respond, and is an example of the above-described telephone exchange apparatus 10. Here, the processing of the PBX 10a is divided into two phases. A first phase is a phase (operation log generation processing) of generating an operation log L which is a usage history of the telephone terminal 30 used by the user. A second phase is a phase (telephone exchange processing) of relaying an incoming call to the called party by using the operation log L. The PBX 10a includes an acquisition unit 11a, an extraction unit 12a, a specification unit 13a, a call control unit 14a, a storage unit 15, and a timer 16.

The acquisition unit 11a is an example of the acquisition unit 11 described above. The acquisition unit 11a cooperates with the schedule management application 21 to acquire the event information I of the user. Specifically, in the first phase, in a case where an outgoing-call operation or a response operation from the telephone terminal 30 which is the called party is detected, the acquisition unit 11a acquires event information I corresponding to an operation date and time from the schedule information S of the user having the user ID associated with the telephone terminal 30. The operation date and time is the current date and time that the acquisition unit 11a acquires from the timer 16 via the call control unit 14a at the time of operation detection. In a case where the outgoing-call operation is detected, the operation date and time may be replaced with the outgoing date and time. Further, in a case where the response operation is detected, the operation date and time may be replaced with the incoming date and time. The fact that the event information I corresponds to the operation date and time indicates that information indicating a period contained in the event information I includes the operation date and time. More specifically, the acquisition unit 11a first inquires the schedule management application 21 of the user terminal 20 of the user about whether the event information I corresponding to the operation date and time is contained in the schedule information S of the user or not. Then, in a case where the event information I corresponding to the operation date and time is contained in the schedule information S of the user, the acquisition unit 11a acquires the event information I from the schedule management application 21 via the calendar API 22. As a result, the event information I of the user can be acquired easily. Then, the acquisition unit 11a supplies the acquired event information I to the extraction unit 12a.

In addition, in the second phase, in a case where the call control unit 14a detects an incoming call request, which includes the user ID of the user who is the called party, from the telephone terminal 30 of the calling party, the acquisition unit 11a acquires event information I corresponding to the incoming date and time from the schedule information S of the user. In this case, the acquisition unit 11a inquires the schedule management application 21 of the user terminal 20 of the user about whether the event information I corresponding to the incoming date and time is contained in the schedule information S or not. In a case where the event information I corresponding to the incoming date and time is contained in the schedule information S, the acquisition unit 11a acquires the event information I from the schedule management application 21 via the calendar API 22. Then, the acquisition unit 11a supplies the acquired event information I to the extraction unit 12a.

The extraction unit 12a is an example of the extraction unit 12 described above. In the first phase, the extraction unit 12a determines whether location information can be extracted from the event information I acquired by the acquisition unit 11a or not. In this case, in a case where the event information I indicates a location attribute, the extraction unit 12a determines that the location information can be extracted from the event information I. That is, in a case where the event item information is contained in the event information I and the event item information indicates a location attribute, the extraction unit 12a determines that the location information can be extracted from the event information I. The extraction unit 12a may determine whether the event item information indicates the location attribute or not by determining whether a character string of the event item information matches a character string indicating a predetermined location attribute or not or whether the degree of similarity between the character strings is equal to or greater than a predetermined threshold value or not. In addition, the extraction unit 12a may determine whether the event item information indicates a location attribute or not by using a classifier including a learned neural network. Then, the extraction unit 12a acquires location information on the basis of the specified location attribute. For example, in a case where the event information I contains "Out on business" or "Outside the office" as the event item information, the extraction unit 12a acquires location information of "Outside the office". As a result, the extraction unit 12a can extract the location information from the event information I. On the other hand, in a case where the event information I does not indicate a location attribute, the extraction unit 12a determines that the location information cannot be extracted from the event information I.

Subsequently, in the first phase, the extraction unit 12a generates an operation log L in which at least the telephone terminal ID, the operation date and time, and the extracted location information, which relate to the outgoing-call operation or the response operation, are associated with each other. Then, the extraction unit 12a stores the generated operation log L in the storage unit 15.

In addition, in the second phase, the extraction unit 12a determines whether location information can be extracted from the event information I or not as in the first phase. Subsequently, the extraction unit 12a extracts the location information from the event information I, and supplies the extracted location information to the specification unit 13a.

The specification unit 13a is an example of the above-described specification unit 13. In the second phase, in a case where an incoming call including the user ID is detected, the specification unit 13a specifies a telephone terminal ID to which the response is most likely to be made among telephone terminal IDs corresponding to the user ID on the basis of the operation log L. In the second example embodiment, the specification unit 13a first calculates a response probability for each telephone terminal ID corresponding to the user ID on the basis of the operation log L stored in the storage unit 15. At this time, in the same time zone of the same place or the same day of the week, the user is often in the same environment, and it is expected that the telephone terminal 30 used for the response also tend to be the same. Therefore, the specification unit 13a specifically performs the following processing. For example, in a case where the extraction unit 12a extracts the location information from the event information I, the specification unit 13a extracts the operation log L stored in the storage unit 15 on the basis of the location information. On the other hand, in a case where the extraction unit 12a cannot acquire (or does not acquire) the event information I or cannot extract (or does not extract) the location information of the user, the specification unit 13a extracts the operation log L stored in the storage unit 15 on the basis of the current time, the time zone, or the day of the week. Note that it is assumed that the period of the event registered as the event information I in the schedule management application 21 is one hour long in many cases, and the extraction unit 12a sets a record having a period of 30 minutes before and after the current time (incoming-call time) in the operation log L as an extraction target. However, the time range of the record to be extracted is not limited to this. For example, the period may be a range of one hour before and after the current time, or a range of two hours before the current time and one hour after the current time.

Then, the specification unit 13a calculates a response probability for each telephone terminal ID corresponding to the user ID on the basis of the extracted operation log L. Specifically, the specification unit 13a calculates the response probability for each telephone terminal ID by dividing the number of times of the response of each telephone terminal by the total number of pieces of extracted data. Here, assuming that the total number of pieces of the extracted data is N and the number of times of the response of the telephone terminal 30-1 is Na, a response probability Pa of the telephone terminal 30-1 is calculated by the following equation (1).

$$Pa=Na/N \qquad (1)$$

Then, the specification unit 13a specifies a telephone terminal ID having the highest response probability. As described above, even in a case where the location of the called party can be confirmed or cannot be confirmed, the telephone terminal 30 that is most easily connected to the called party can be specified easily. In addition, since the telephone terminal 30 is specified from the response probability calculated on the basis of the usage history of the called party, the telephone terminal 30 that is easily connected to the called party can be specified with high accuracy in accordance with the state in which the called party uses the telephone terminal. The specification unit 13a supplies the specified telephone terminal ID to the call control unit 14a.

Note that the specification unit 13a may specify the telephone terminal IDs in descending order of the response probabilities and supply the specified telephone terminal ID to the call control unit 14a. For example, the specification unit 13a may supply the telephone terminal ID having the highest response probability to the call control unit 14a. Further, in a case where there is no response from the called party, the specification unit 13a may supply a telephone terminal ID having the next higher response probability to the call control unit 14a. In addition, for example, the specification unit 13a may collectively supply information in which the response probability and the telephone terminal ID are associated with each other to the call control unit 14a.

The call control unit 14a is an example of the call control unit 14 described above.

In the first phase, in response to a fact that an incoming call including at least the telephone terminal ID of the called party is detected, the call control unit 14a causes the telephone terminal 30 having the telephone terminal ID to ring to call the telephone terminal 30. Then, the call control unit 14a detects a response operation to an incoming call, the response operation being performed by the telephone terminal 30 of the called party. At this time, the call control unit 14a specifies the user ID of the called party (operator) who has performed the response operation by an arbitrary method. For example, the incoming call may include the user ID of the operator in addition to the telephone terminal ID of the called party (operator), and the call control unit 14a may specify the user ID of the operator when detecting the incoming call. In addition, for example, the call control unit

14a may specify the user ID when the telephone terminal 30 of the called party (operator) transmits the user ID of the operator to the PBX 10a at the time of responding to the incoming call. In addition, the PBX 10a may store a table in which the telephone terminal ID and the user ID are associated with each other in the storage unit 15 in advance, and may specify the user ID associated with the telephone terminal ID of the response operation source with reference to the table.

In addition, in the first phase, the call control unit 14a detects an outgoing-call operation of the calling party. At this time, the call control unit 14a specifies the user ID of the calling party (operator) who has performed the outgoing-call operation by an arbitrary method. For example, the outgoing call includes the user ID of the calling party (operator) in addition to the telephone terminal ID of the called party (the other party), and the call control unit 14a may specify the user ID of the operator when detecting the outgoing-call operation. Note that the outgoing call may or may not include the user ID of the called party (the other party). In addition, in a case where a table in which the telephone terminal ID and the user ID are associated with each other is stored in the storage unit 15 in advance, the PBX 10a may specify the user ID associated with the telephone terminal ID of the outgoing-call operation source with reference to the table.

In this manner, the call control unit 14a acquires the user ID of the operator. The call control unit 14a supplies the user ID of the operator to the acquisition unit 11a.

In addition, in the second phase, the call control unit 14a detects the incoming call including at least the user ID of the called party. At this time, the call control unit 14a acquires the current date and time from the timer 16, and supplies, as the fact that the incoming call is detected, the user ID of the called party and the current date and time to the acquisition unit 11a. In the second phase, in a case where the specification unit 13a specifies the telephone terminal ID, the call control unit 14a causes the telephone terminal 30 having the telephone terminal ID to ring to call the telephone terminal 30. Therefore, since the telephone terminal ID having the highest response probability is first used for the ringing control, the call control unit 14a can cause the telephone terminal that is most easily connected to the called party to ring to call the telephone terminal. Note that assuming a case where the called party does not respond, the call control unit 14a may cause the telephone terminal to ring in descending order of the response probabilities. Therefore, it is possible to reliably connect the telephone to the called party.

The storage unit 15 is a storage device that stores information necessary for operation log generation processing and telephone exchange processing of the PBX 10a. The storage unit 15 stores at least the operation log L.

The timer 16 is an example of a clocking unit that acquires the current date and time. In addition, the timer 16 may acquire the day of the week from the current date and time.

FIG. 4 is a diagram illustrating an example of a data structure of the operation log L according to the second example embodiment. The operation log L illustrated in the drawing is information in which a user ID, a telephone terminal ID, a place (location information), a date, a day of the week, and a time are associated with each other. For example, a second record in the drawing indicates the operation log L in a case where a user B performs a response operation to an incoming call with the telephone terminal 30 of a telephone terminal ID "T004" at a time "9:28:22" on "2020/11/2". At this time, the acquisition unit 11a specifies the user ID included in the incoming call, and acquires the event information I corresponding to the time "9:28:22" from the schedule management application 21 of the user terminal 20 of the user having the user ID. Then, for example, the extraction unit 12a extracts the location information "Conference room X" from the event information I "In a meeting (Conference room X): 2020/11/2 9:00-11:00", and records the user ID, the telephone terminal ID, the location information, the date, the day of the week, and the time as the operation log L. Note that in a case where the event information I cannot be acquired or in a case where the location information cannot be extracted from the event information I, the extraction unit 12a records the operation log L with the location information left blank "-" as in the first record in the drawing.

Figure 5:
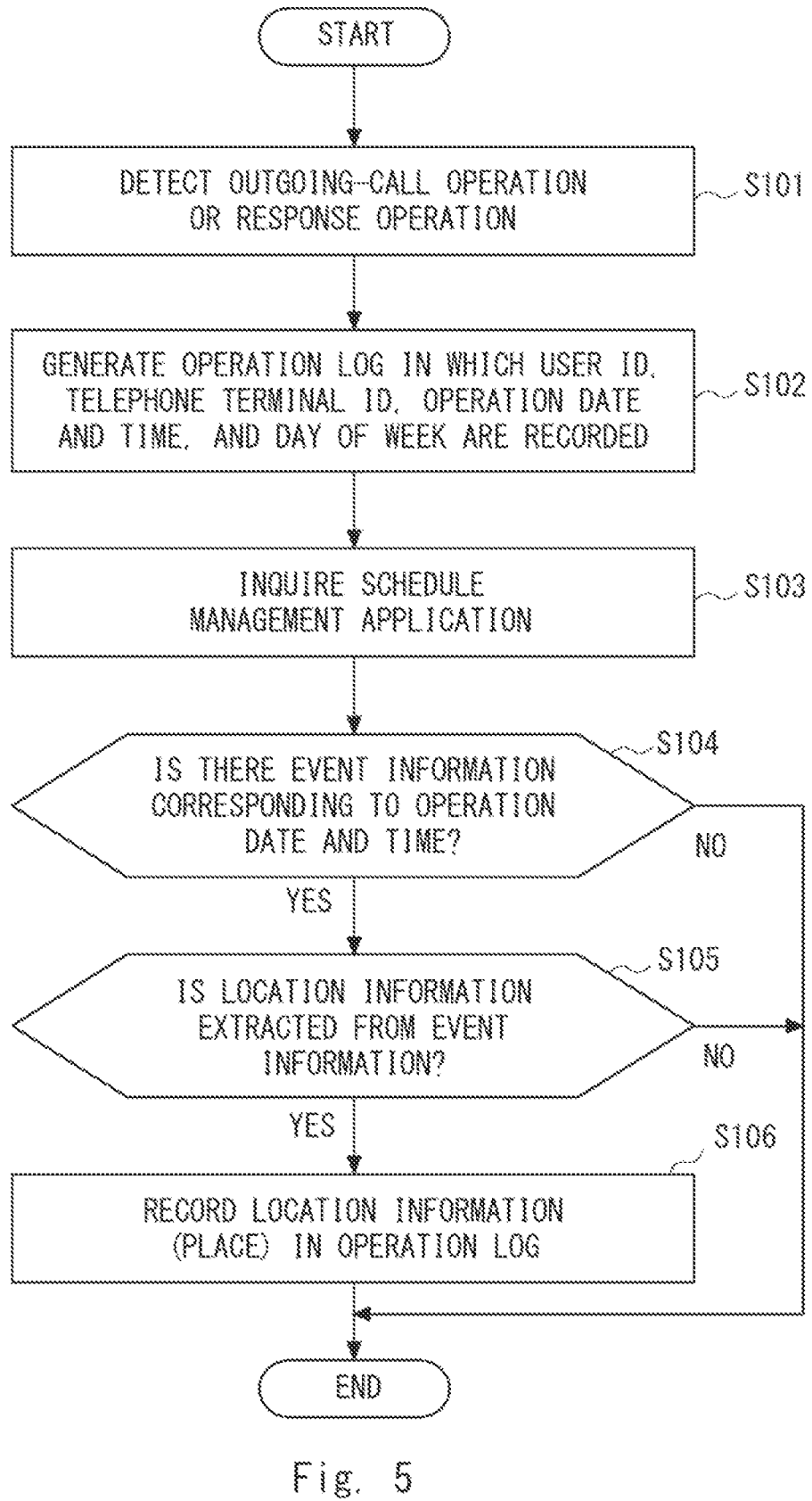
FIG. 5 is a flowchart illustrating a flow of an operation log generation method according to the second example embodiment.

FIG. 5 is a flowchart illustrating a flow of an operation log generation method according to the second example embodiment. First, the call control unit 14a detects an outgoing-call operation or a response operation (Step S101). The call control unit 14a specifies a user ID of an operator and causes the processing to proceed to Step S102.

Then, the extraction unit 12a generates (newly creates) an operation log L in which the user ID of the operator, a telephone terminal ID, an operation date and time, and a day of the week are recorded (Step S102). In addition, the acquisition unit 11a inquires the schedule management application 21 of the user terminal 20 corresponding to the user ID of the operator about event information I corresponding to the operation date and time (Step S103). Here, the acquisition unit 11a determines whether there is the event information I corresponding to the operation date and time contained in the schedule information S or not (Step S104). In a case where there is the event information I corresponding to the operation date and time (YES at Step S104), the acquisition unit 11a acquires the event information I from the schedule management application 21 via the calendar API 22, and causes the processing to proceed to Step S105. On the other hand, in a case where there is no event information I corresponding to the operation date and time (NO at Step S104), the acquisition unit 11a ends the processing.

At Step S105, the extraction unit 12a attempts to extract location information from the acquired event information I, and determines whether the location information has been extracted or not. In a case where the location information is extracted (YES at Step S105), the extraction unit 12a records the location information in the operation log L generated at Step S102 (Step S106), and ends the processing. On the other hand, in a case where the location information is not extracted (NO at Step S105), the extraction unit 12a ends the processing.

Figure 6:
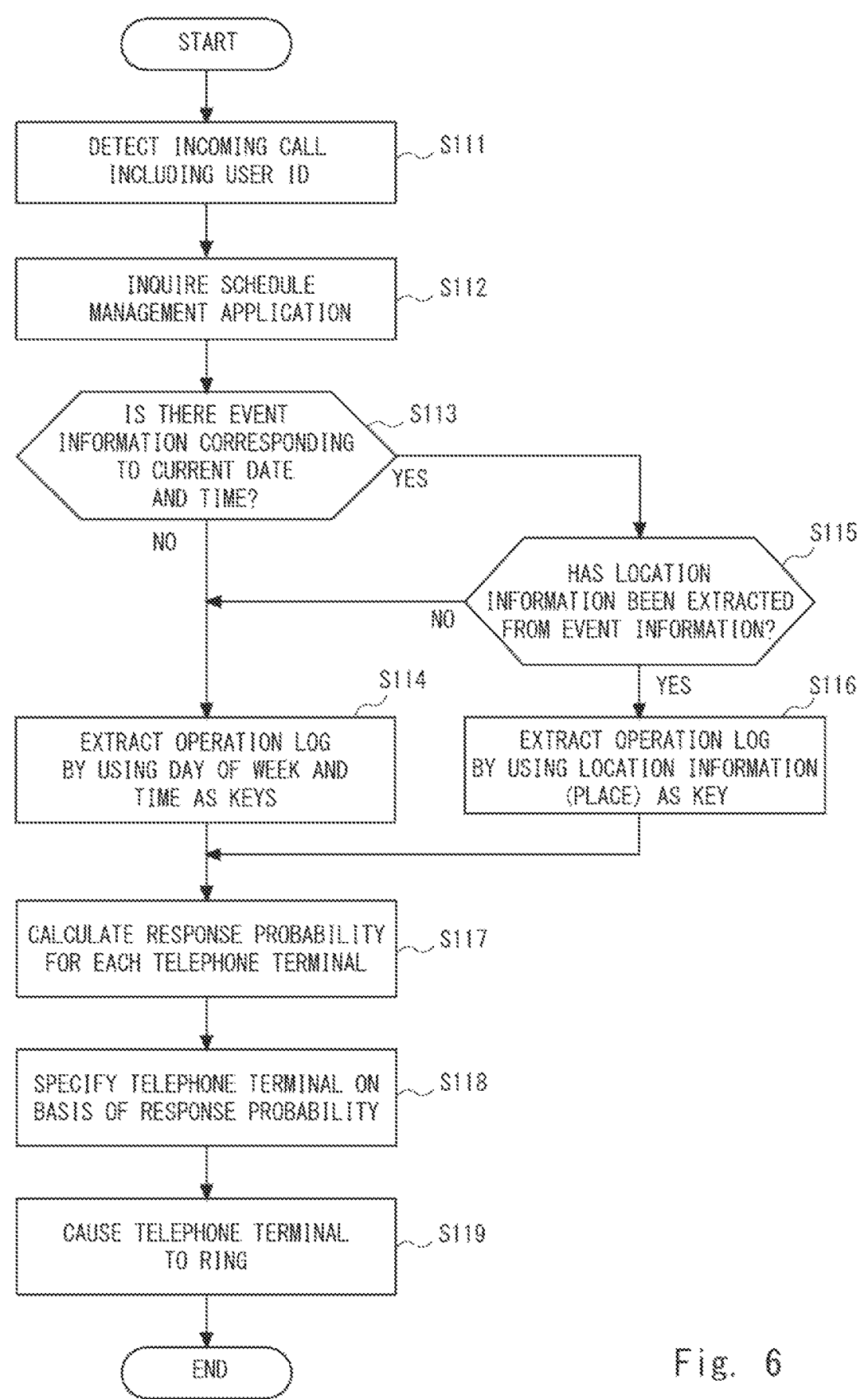
FIG. 6 is a flowchart illustrating a flow of a telephone exchange method according to the second example embodiment.

FIG. 6 is a flowchart illustrating a flow of a telephone exchange method according to the second example embodiment. First, the call control unit 14a detects an incoming call including the user ID of a called party (Step S111). The call control unit 14a supplies, as the fact that the incoming call is detected, the user ID of the called party and the current date and time to the acquisition unit 11a, and causes the processing to proceed to Step S112. The acquisition unit 11a inquires the schedule management application 21 of the user terminal 20 corresponding to the user ID of the called party about the event information I corresponding to the current date and time (Step S112). Here, the acquisition unit 11a determines whether there is the event information I corresponding to the current date and time contained in the schedule information S or not (Step S113).

In a case where there is no event information I corresponding to the current date and time (NO at Step S113), the acquisition unit 11a causes the processing to proceed to Step S114. At Step S114, the extraction unit 12a extracts the operation log L of the user corresponding to the day of the week and the time in the current time from the operation log L stored in the storage unit 15 by using the user ID, and the day of the week and the time in the current date and time as keys. Note that the specification unit 13a attempts to extract the operation log L by using the user ID and the day of the week and the time in the current time as keys, but in a case where there is no operation log L to be extracted, the specification unit 13a may expand a range of the time to be extracted and then extract the operation log L again. Then, the extraction unit 12a causes the processing to proceed to Step S117.

On the other hand, in a case where there is the event information I corresponding to the current date and time (YES at Step S113), the acquisition unit 11a acquires the event information I from the schedule management application 21 via the calendar API 22, and causes the processing to proceed to Step S115. The extraction unit 12a attempts to extract location information from the acquired event information I, and determines whether the location information has been extracted or not (Step S115). In a case where the extraction unit 12a extracts the location information (YES at Step S115), the specification unit 13a extracts the operation log L of the user corresponding to the extracted location information from the operation logs L stored in the storage unit 15 by using the user ID and the location information (place) as keys (Step S116). Note that the operation log L of the user corresponding to the extracted location information may be the operation log L of the user having the same location information, or may be the operation log L of the user having the degree of similarity of the location information which is a predetermined threshold value or more. Then, the specification unit 13a causes the processing to proceed to Step S117. Note that the specification unit 13a attempts to extract the operation log L by using the user ID and the location information as keys, but in a case where there is no operation log L to be extracted, the processing may be caused to proceed to Step S114. Examples of the case where there is no operation log L to be extracted include a case where the user has never used the telephone terminal 30 at the place in the past and a case where the schedule related to the place has not been registered in the past.

On the other hand, in a case where the extraction unit 12a does not extract the location information (NO at Step S115), the processing is caused to proceed to Step S114. That is, in this case, the specification unit 13a extracts the operation log L of the user corresponding to the day of the week and the time in the current time from the operation logs L stored in the storage unit 15 by using the user ID, and the day of the week and the time in the current date and time as keys, and causes the processing to proceed to Step S117.

At Step S117, the specification unit 13a calculates a response probability for each telephone terminal ID, that is, for each telephone terminal, on the basis of the extracted operation log L. Then, the specification unit 13a specifies a telephone terminal ID on the basis of the response probability (Step S118). For example, the specification unit 13a specifies a telephone terminal ID having the highest response probability. The call control unit 14a causes the telephone terminal 30 having the telephone terminal ID to ring by using the specified telephone terminal ID (Step S119). Note the call control unit 14a may cause the telephone terminal 30 of the telephone terminal ID to ring in descending order of the response probabilities. Then, in a case where the called party has responded, the call control unit 14a establishes a call path between the telephone terminal 30 of the calling party and the telephone terminal 30 to which the called party has responded, and ends the processing.

Note that in a case where there is a response from the called party, the extraction unit 12a may generate an operation log L for the response operation and store the operation log L in the storage unit 15. Specifically, the extraction unit 12a generates the operation log L for the response operation in association with the user ID included in the incoming call, the telephone terminal ID with which the response has made, the current date and time, and the day of the week. Note that, in a case where the location information is extracted at Step S115 described above, the extraction unit 12a causes the location information to be contained in the operation log L for the response operation. By accumulating the operation log L in this manner, it is possible to more accurately specify the telephone terminal 30 having a high response possibility.

FIGS. 7 and 8 are diagrams for explaining operation log extraction processing according to the second example embodiment. FIGS. 7 and 8 illustrate an example of the operation log L extracted in a case where a user A receives an incoming call. FIG. 7 illustrates the operation log L extracted by the specification unit 13a in a case where the extraction unit 12a extracts "Outside the office" as the location information from the event information I acquired at the time of the incoming call. At this time, the specification unit 13a extracts the operation log L in which the user ID is a "user A" and the location information is "Outside the office" among the operation logs L accumulated in the storage unit 15. In a case where the extracted operation logs L are those illustrated in FIG. 7, the response probabilities Pa, Pb, and Pc of the telephone terminals "T001", "T002", and "T003" are calculated by the following equations (2) to (4), respectively.

$$\text{Telephone terminal ``}T001\text{'': } Pa=Na/N=3/6=0.50 \tag{2}$$

$$\text{Telephone terminal ``}T002\text{'': } Pb=Nb/N=2/6\approx0.33 \tag{3}$$

$$\text{Telephone terminal ``}T003\text{'': } Pc=Nc/N=1/6\approx0.17 \tag{4}$$

Note that Na, Nb, and Nc are the number of times that the user A makes a call or responds to a call by using the telephone terminals "T001", "T002", and "T003" while being "outside the office", respectively. N is the total number of times the user A makes a call or responds to a call while being "outside the office".

Therefore, the specification unit 13a may determine the order of the telephone terminals 30 to ring in the order of the telephone terminal "T001", the telephone terminal "T002", and the telephone terminal "T003".

FIG. 8 illustrates an example of the operation log L extracted by the specification unit 13a in a case where the acquisition unit 11a cannot acquire the event information I since the event information I is not registered or in a case where the extraction unit 12a cannot extract the location information although the event information I is registered. When the user A receives an incoming call at 15:00 on Monday, the specification unit 13a extracts, from the operation logs L accumulated in the storage unit 15, an operation log L in which the user ID is the "user A", the day of the week is "Monday", and the time ranges from 14:30 to 15:30. In a case where the extracted data are those illustrated in FIG. 8, the response probabilities Pa', Pb', and Pc' of the telephone terminals "T001", "T002", and "T003" are calculated by the following equations (5) to (7), respectively.

$$\text{Telephone terminal ``}T001\text{'': } Pa'=Na'/N'=2/6\approx0.33 \tag{5}$$

$$\text{Telephone terminal ``}T002\text{'': } Pb'=Nb'/N'=1/6\ 0.17 \tag{6}$$

$$\text{Telephone terminal ``}T003\text{'': } Pc'=Nc'/N'=3/6=0.50 \tag{7}$$

Note that Na', Nb', and Nc' are the number of times that the user A makes a call or responds to a call by using the telephone terminals "T001", "T002", and "T003" at any time of 14:30 to 15:30 on Monday, respectively. N' is the total number of times that the user A makes a call or responded to a call at any time of 14:30 to 15:30 on Monday.

Therefore, the specification unit 13a may determine the order of the telephone terminals 30 to ring in the order of the telephone terminal "T003", the telephone terminal "T001", and the telephone terminal "T002".

As described above, according to the second example embodiment, when there is an incoming call to the user, the PBX 10a calculates the response probability of each of the telephone terminals 30 used by the user in the past, and determines which telephone terminal 30 among these telephone terminals 30 is caused to ring. When the location information can be acquired from the current schedule of the user who receives the incoming call, the PBX 10a extracts the operation log L by using the location information as a key, and calculates the response probability of each telephone terminal 30. On the other hand, when the location information cannot be acquired from the current schedule of the user who receives the incoming call, the PBX 10a extracts the operation log L by using the day of the week and the time as keys, and calculates the response probability of each telephone terminal 30. Then, the PBX 10a causes the telephone terminal 30 having the highest calculated response probability to ring or the telephone terminal 30 to ring in descending order of the response probabilities.

Therefore, the following effects can be expected for the called party. First, by not unnecessarily causing the telephone terminal 30 that is unlikely to respond to ring, it is possible to more reliably connect the telephone to the user while keeping the environment around the telephone terminal 30 quiet. For example, in a case where the telephone terminal 30 is installed in the office, it is possible to more reliably connect the telephone to the user while providing a quiet office environment. In addition, it is possible to suppress an increase in network traffic and prevent congestion. In addition, since the network traffic is suppressed, the hardware resources of the PBX 10a can be saved. In addition, it is possible to save time and effort for the user to set the ringing order one by one or change the setting. Note that since the PBX 10a causes the telephone terminal selected on the basis of a usage history of the telephone terminal used by the user in the past to ring to call the telephone terminal 30, the user does not necessarily need to register, in advance, the telephone terminal 30 to be used, and this makes it possible to further reduce the time and effort. In addition, the PBX 10a also can cause the telephone terminal 30 to ring, which is not owned by the user but may be used, such as a shared telephone terminal 30 installed in a conference room as well as the telephone terminal 30 owned by the user.

In addition, the calling party can make a call to the telephone terminal 30, which is most easily connected, only by selecting the user ID as the other party's name and performing an outgoing-call operation without selecting the telephone terminal ID of the telephone terminal 30 from a telephone directory. Even when the other party has a plurality of telephone terminals 30 or is not available due to the meeting, the PBX 10a automatically selects the telephone terminal 30 that is most easily connected, and causes the telephone terminal 30 to ring. Therefore, the calling party does not need to consider where the other party with who the calling party wants to contact is currently, and does not need to consider which telephone terminal 30 the calling party should call. In addition, in a case where the PBX 10a causes the telephone terminal 30 to ring in descending order of the response probabilities, the calling party does not need to perform an outgoing-call operation to the telephone terminal 30 of the called party one after another, which improves convenience.

Therefore, according to the second example embodiment, it is possible to realize a more user-centric PBX 10a.

Figure 9:
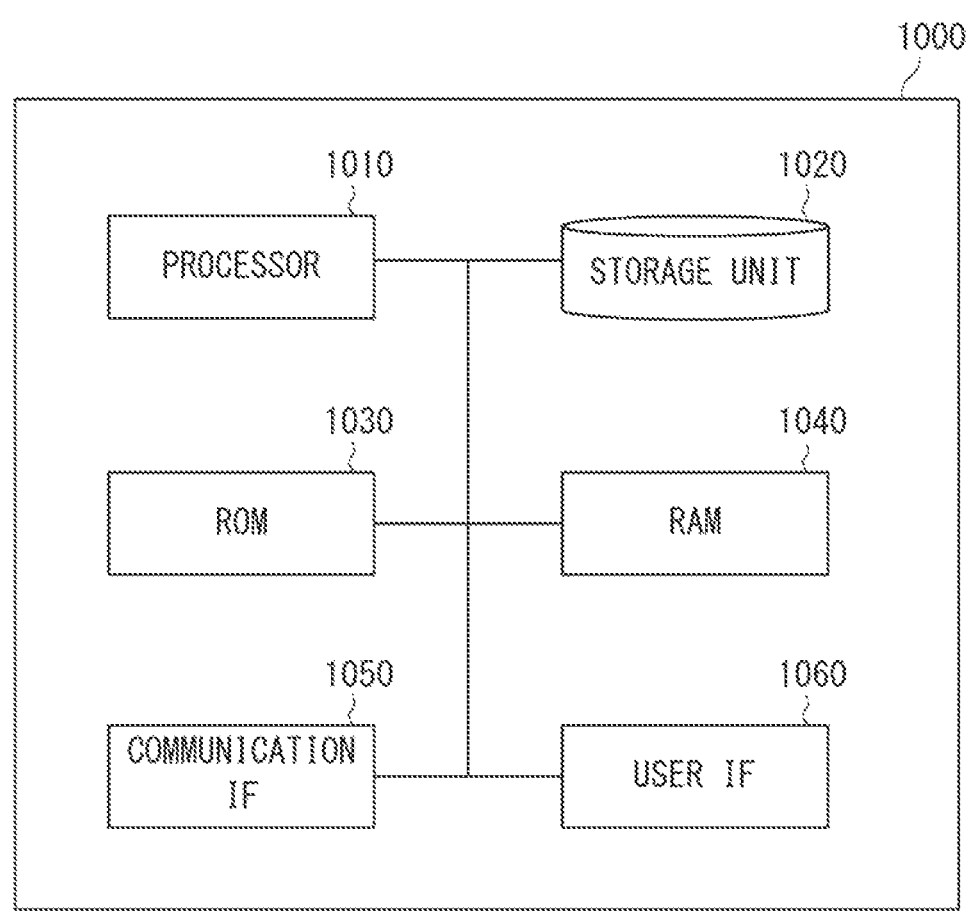
FIG. 9 is a diagram illustrating a configuration example of a computer that can be used as a telephone exchange apparatus and a PBX.

Next, physical configurations of a telephone exchange apparatus and a PBX will be described. FIG. 9 is a diagram illustrating a configuration example of a computer that can be used as the telephone exchange apparatus and the PBX. A computer 1000 includes a processor 1010, a storage unit 1020, a read only memory (ROM) 1030, a random access memory (RAM) 1040, a communication interface (IF) 1050, and a user interface 1060.

The communication interface 1050 is an interface for connecting the computer 1000 to a communication network through wired communication means, wireless communication means, or the like. The user interface 1060 includes, for example, a display unit such as a display. In addition, the user interface 1060 also includes input units such as a keyboard, a mouse, and a touch panel. Note that the user interface 1060 is not essential.

The storage unit 1020 is an auxiliary storage device that can hold various types of data. The storage unit 1020 does not necessarily have to be a part of the computer 1000, but may be an external storage device, or a cloud storage connected to the computer 1000 via a network.

The ROM 1030 is a non-volatile storage device. For example, a semiconductor storage device such as a flash memory having a relatively small capacity is used for the ROM 1030. A program that is executed by the processor 1010 can be stored in the storage unit 1020 or the ROM 1030. The storage unit 1020 or the ROM 1030 stores, for example, various programs for realizing the function of each unit in the telephone exchange apparatus and the PBX.

The program described above includes a group of instructions (or software codes) for causing a computer to perform one or more functions described in the example embodiments when being read by the computer. The program may be stored in a non-transitory computer-readable medium or a tangible storage medium. By way of examples, and not limitation, a computer-readable medium or tangible storage medium includes a random-access memory (RAM), a read-only memory (ROM), a flash memory, a solid-state drive (SSD) or other memory technology, a CD-ROM, a digital versatile disc (DVD), a Blu-ray (registered trademark) disk or other optical disk storage, a magnetic cassette, a magnetic tape, a magnetic disk storage, or other magnetic storage devices. The program may be transmitted on a transitory computer-readable medium or a communications medium. By way of examples, and not limitation, the transitory computer-readable or the communications medium includes electrical, optical, acoustic, or other forms of propagated signals.

The RAM 1040 is a volatile storage device. As the RAM 1040, various types of semiconductor memory devices such as a dynamic random access memory (DRAM) or a static random access memory (SRAM) can be used. The RAM 1040 can be used as an internal buffer for temporarily storing data and the like. The processor 1010 deploys a program stored in the storage unit 1020 or the ROM 1030 into the RAM 1040, and executes the deployed program. The processor 1010 may be a central processing unit (CPU) or a graphics processing unit (GPU). The function of each unit in the telephone exchange apparatus and the PBX can be implemented by the processor 1010 executing the program. The processor 1010 may include an internal buffer in which data and the like can be temporarily stored.

Although the present disclosure has been described above with reference to the example embodiments, the present disclosure is not limited to the above description. Various modifications that could be understood by those skilled in the art can be made to the configuration and details of the present disclosure within the scope of the invention.

In the second example embodiment described above, in a case where there is no operation log L extracted by using the location information acquired from the user ID and the event information I as keys, the specification unit 13a specifies the telephone terminal 30 on the basis of the operation log L extracted by using the user ID, the day of the week, and the time as keys. However, alternatively or additionally, the specification unit 13a may specify the telephone terminal 30 on the basis of the operation log L of another user. For example, in a case where the location information acquired from the event information I is a place used by a plurality of persons, such as a conference room A, and is a place where the shared telephone terminal 30 is installed, the specification unit 13a may specify the telephone terminal ID corresponding to the location information from the operation log L of another user. In this case, the PBX 10a may have a table in which the telephone terminal ID of the telephone terminal 30 is associated with the installation location, and may specify the telephone terminal ID corresponding to the location information with reference to the table. Note that the specification unit 13a may set the telephone terminal ID specified from the operation log L of another user as a first priority telephone terminal ID as described above, or may set a priority order to be lower than that of the telephone terminal ID specified from the operation log L of the user corresponding to the day of the week and the time.

In addition, in the second example embodiment described above, in a case where the location information can be acquired, the specification unit 13a of the PBX 10a extracts the operation log L on the basis of the location information, calculates the response probability for each telephone terminal ID from the extracted operation log L, and specifies the telephone terminal ID on the basis of the response probability. However, instead of this, in a case where the location information can be acquired, the specification unit 13a may specify a type of telephone terminal that is most easily connected on the basis of the location information, and specify the telephone terminal ID of the telephone terminal 30 matching the type of the telephone terminal. In this case, the operation log L as the past usage history may include the type of telephone terminal corresponding to the telephone terminal ID instead of or in addition to the location information. Specifically, in a case where the location information can be acquired, the specification unit 13a may specify, from the operation log L corresponding to the user ID, the telephone terminal ID including the type of telephone terminal corresponding to the location information as the telephone terminal ID of the telephone terminal 30 to be caused to ring with first priority. For example, when the location information is "Outside the office", the specification unit 13*a* specifies the mobile phone as the telephone terminal 30 that is caused to ring with first priority. Note that in a case where the telephone terminal ID of the type of telephone terminal corresponding to the location information cannot be specified from the operation log L, the specification unit 13*a* may specify the telephone terminal ID of the telephone terminal 30 including an installation place corresponding to the location information by using the table in which the telephone terminal ID described above and the installation place are associated with each other. For example, when the location information is "Conference room A", the specification unit 13*a* specifies the telephone terminal 30 installed in the conference room A as the telephone terminal 30 that is caused to ring with first priority. Note that in a case where there is no event information I or the location information cannot be acquired from the event information I, the specification unit 13*a* may perform processing similar to that of the above-described second example embodiment.

Some or all of the above-described example embodiments may be described as in the following Supplementary Notes, but are not limited to the following Supplementary Notes.

(Supplementary Note 1)

A telephone exchange apparatus comprising:

an acquisition unit configured to acquire event information of a user having a user ID in a case where an incoming call including the user ID is detected, the event information indicating a schedule event;

an extraction unit configured to extract location information of the user from the event information;

a specification unit configured to specify a telephone terminal to which the user is most likely to respond among telephone terminals on a basis of the location information, the telephone terminals having been used by the user in a past; and a call control unit configured to cause the specified telephone terminal to ring.

(Supplementary Note 2)

The telephone exchange apparatus according to Supplementary Note 1, wherein the acquisition unit is configured to acquire the event information from a schedule management application configured to manage a schedule of the user.

(Supplementary Note 3)

The telephone exchange apparatus according to Supplementary Note 1 or 2, wherein in a case where an outgoing-call operation or a response operation from a telephone terminal is detected, the acquisition unit is configured to acquire event information of a user having a user ID associated with the telephone terminal, and the extraction unit is configured to extract location information from the event information, generate an operation log in which a telephone terminal ID, an operation date and time, and the location information are associated with each other, and store the operation log in a storage unit, and in a case where an incoming call including the user ID is detected, the specification unit is configured to specify a telephone terminal ID having a highest response possibility from among telephone terminal IDs corresponding to the user ID on a basis of the operation log.

(Supplementary Note 4)

The telephone exchange apparatus according to Supplementary Note 3, wherein in a case where the incoming call including the user ID is detected, the specification unit is configured to calculate a response probability for each telephone terminal ID corresponding to the user ID on a basis of the operation log stored in the storage unit.

(Supplementary Note 5)

The telephone exchange apparatus according to Supplementary Note 4, wherein in a case where the incoming call including the user ID is detected and the location information is extracted from the acquired event information, the specification unit is configured to extract an operation log stored in the storage unit on a basis of the location information, and calculate the response probability for each telephone terminal ID corresponding to the user ID on a basis of the extracted operation log.

(Supplementary Note 6)

The telephone exchange apparatus according to Supplementary Note 4 or 5, wherein in a case where the incoming call including the user ID is detected and the event information is not acquired or the location information of the user is not extracted, the specification unit is configured to extract the operation log stored in the storage unit on a basis of a current time, a time zone, or a day of week, and calculate the response probability for each telephone terminal ID corresponding to the user ID on a basis of the extracted operation log.

(Supplementary Note 7)

The telephone exchange apparatus according to any one of Supplementary Notes 4 to 6, wherein the call control unit is configured to cause each telephone terminal having the telephone terminal ID to ring in descending order of the response probabilities.

(Supplementary Note 8)

A telephone system comprising:

a plurality of telephone terminals; and the telephone exchange apparatus according to any one of Supplementary Notes 1 to 7.

(Supplementary Note 9)

The telephone system according to Supplementary Note 8, wherein the acquisition unit is configured to acquire the event information from a schedule management application configured to manage a schedule of the user.

(Supplementary Note 10)

A telephone exchange method performed by a computer functioning as the telephone exchange apparatus according to any one of Supplementary Notes 1 to 7.

(Supplementary Note 11)

A program for causing a computer to execute the telephone exchange method according to Supplementary Note 10.

This application claims priority based on Japanese Patent Application No. 2021-062479 filed on Apr. 1, 2021, and the entire disclosure thereof is incorporated herein.

REFERENCE SIGNS LIST

1 TELEPHONE SYSTEM
10, 10*a* TELEPHONE EXCHANGE APPARATUS (PBX)
11, 11*a* ACQUISITION UNIT
12, 12*a* EXTRACTION UNIT
13, 13*a* SPECIFICATION UNIT
14, 14*a* CALL CONTROL UNIT
15 STORAGE UNIT
16 TIMER
20 USER TERMINAL

21 SCHEDULE MANAGEMENT APPLICATION
22 CALENDAR APPLICATION PROGRAMMING INTERFACE (API)
30 TELEPHONE TERMINAL
L OPERATION LOG
S SCHEDULE INFORMATION
I EVENT INFORMATION

What is claimed is:

1. A telephone exchange apparatus comprising:
a memory storing instructions; and
a processor configured to execute the instructions to:
   acquire event information of a user having a user ID in a case where an incoming call including the user ID is detected, the event information indicating a schedule event;
   extract location information of the user from the event information;
   specify a telephone terminal to which the user is most likely to respond among telephone terminals on a basis of the location information, the telephone terminals having been used by the user in a past; and
   cause the specified telephone terminal to ring,
wherein the processor is configured to:
   in a case where an outgoing-call operation or a response operation from a telephone terminal is detected:
      acquire event information of a user having a user ID associated with the telephone terminal;
      extract location information from the event information;
      generate an operation log in which a telephone terminal ID, an operation date and time, and the location information are associated with each other, and store the operation log in the memory;
   in a case where an incoming call including the user ID is detected:
      calculate a response probability for each telephone terminal ID corresponding to the user ID on a basis of the operation log stored in the memory; and
      specify a telephone terminal ID having a highest response possibility from among telephone terminal IDs corresponding to the user ID on a basis of the operation log.

2. The telephone exchange apparatus according to claim 1, wherein the processor is configured to acquire the event information from a schedule management application configured to manage a schedule of the user.

3. A telephone exchange method performed by a computer functioning as the telephone exchange apparatus according to claim 2.

4. The telephone exchange apparatus according to claim 1, wherein,
in a case where the incoming call including the user ID is detected and the location information is extracted from the acquired event information, and wherein the processor is configured to extract an operation log stored in the memory on a basis of the location information, and calculate the response probability for each telephone terminal ID corresponding to the user ID on a basis of the extracted operation log.

5. The telephone exchange apparatus according to claim 4, wherein the processor is configured to cause each telephone terminal having the telephone terminal ID to ring in descending order of the response probabilities.

6. A telephone exchange method performed by a computer functioning as the telephone exchange apparatus according to claim 4.

7. A telephone exchange method performed by a computer functioning as the telephone exchange apparatus according to claim 5.

8. The telephone exchange apparatus according to claim 1, wherein, in a case where the incoming call including the user ID is detected and the event information is not acquired or the location information of the user is not extracted, and
wherein the processor is configured to extract the operation log stored in the memory on a basis of a current time, a time zone, or a day of week, and calculate the response probability for each telephone terminal ID corresponding to the user ID on a basis of the extracted operation log.

9. The telephone exchange apparatus according to claim 8, wherein the processor is configured to cause each telephone terminal having the telephone terminal ID to ring in descending order of the response probabilities.

10. A telephone exchange method performed by a computer functioning as the telephone exchange apparatus according to claim 8.

11. The telephone exchange apparatus according to claim 1, wherein the processor is configured to cause each telephone terminal having the telephone terminal ID to ring in descending order of the response probabilities.

12. A telephone exchange method performed by a computer functioning as the telephone exchange apparatus according to claim 11.

13. A telephone system comprising:
a plurality of telephone terminals; and
the telephone exchange apparatus according to claim 1.

14. The telephone system according to claim 13, wherein the processor is configured to acquire the event information from a schedule management application configured to manage a schedule of the user.

15. A telephone exchange method performed by a computer functioning as the telephone exchange apparatus according to claim 1.

16. A non-transitory computer readable medium storing a program for causing a computer to execute the telephone exchange method according to claim 15.

* * * * *